US008069650B2

(12) United States Patent
Alm et al.

(10) Patent No.: US 8,069,650 B2
(45) Date of Patent: Dec. 6, 2011

(54) METHOD FOR INTERNAL COMBUSTION ENGINE WITH EXHAUST RECIRCULATION

(75) Inventors: Christer Alm, Göteborg (SE); Hans Bernler, Göteborg (SE)

(73) Assignee: Volvo Lastvagnar AB, Göteborg (SE)

( * ) Notice: Subject to any disclaimer, the term of this patent is extended or adjusted under 35 U.S.C. 154(b) by 842 days.

(21) Appl. No.: 12/067,052

(22) PCT Filed: Sep. 15, 2005

(86) PCT No.: PCT/SE2005/001339
§ 371 (c)(1), (2), (4) Date: Jun. 3, 2008

(87) PCT Pub. No.: WO2007/032714
PCT Pub. Date: Mar. 22, 2007

(65) Prior Publication Data
US 2008/0264049 A1 Oct. 30, 2008

(51) Int. Cl.
*F02M 25/06* (2006.01)
(52) U.S. Cl. ............... 60/278; 60/274; 60/280; 60/285; 60/605.2; 60/605.11
(58) Field of Classification Search ............ 60/274, 60/278, 280, 285, 292, 295, 324, 605.2, 605.11
See application file for complete search history.

(56) References Cited

U.S. PATENT DOCUMENTS

| | | | |
|---|---|---|---|
| 5,775,099 A * | 7/1998 | Ito et al. | 60/274 |
| 5,937,639 A | 8/1999 | Sasaki et al. | |
| 6,209,515 B1 * | 4/2001 | Gotoh et al. | 123/305 |
| 6,644,022 B2 * | 11/2003 | Hirota et al. | 60/297 |
| 6,751,949 B2 * | 6/2004 | Tamura et al. | 60/284 |
| 7,043,900 B2 * | 5/2006 | Shirakawa et al. | 60/280 |
| 7,104,050 B2 * | 9/2006 | Sato et al. | 60/295 |
| 7,247,190 B2 * | 7/2007 | Miura | 95/278 |
| 2002/0144501 A1 | 10/2002 | Uedahira et al. | |
| 2006/0016180 A1 * | 1/2006 | Tomita et al. | 60/297 |

FOREIGN PATENT DOCUMENTS

| | | |
|---|---|---|
| EP | 0957254 A2 | 11/1999 |
| WO | 03046354 A1 | 6/2003 |

OTHER PUBLICATIONS

International Search Report for corresponding International Application PCT/SE2005/001339.

* cited by examiner

*Primary Examiner* — Binh Q Tran
(74) *Attorney, Agent, or Firm* — WRB-IP LLP

(57) ABSTRACT

A method is provided for maintaining the heat in an exhaust after treatment system connected to the exhaust pipe of an internal combustion engine. The engine is used to propel a vehicle and is equipped with a valve-controlled EGR duct for the adjustable recirculation of exhaust gases from the exhaust side of the engine to its induction side. According to the invention, it is detected that neither the braking system nor the throttle control mechanism of the vehicle is activated and that the vehicle is being driven at a speed in excess of a predetermined value. After this, the gas flow through the EGR duct is regulated so that the gas flow to the exhaust aftertreatment system is reduced to a level which is less than about 50% of the gas flow to the exhaust aftertreatment system with shut-off EGR valve.

8 Claims, 2 Drawing Sheets

METHOD FOR INTERNAL COMBUSTION ENGINE WITH EXHAUST RECIRCULATION

BACKGROUND AND SUMMARY

The present invention relates to a method for maintaining the heat in an exhaust aftertreatment system connected to the exhaust pipe of an internal combustion engine, which engine is used to propel a vehicle and is equipped with a valve-controlled EGR duct for adjustable recirculation of exhaust gases from the exhaust side of the engine to its induction side.

In internal combustion engines with exhaust aftertreatment systems, it is desirable for these aftertreatment systems to be able to operate within a favorable temperature range, for example 250-350 degrees Celsius. Sometimes, the operating conditions of an internal combustion engine can be such that the exhaust gas temperature is too low for said temperature range to be able to be maintained. One example of such operating conditions is when the engine is dragging, i.e. a vehicle which is normally driven by the engine is coasting down a hill. In this instance, the engine is in principle pumping fresh air to the exhaust system.

It is known to supply hydrocarbons to the exhaust gas stream in order to increase the temperature and thereby maintain a temperature range. The drawback with such methods is increased fuel consumption. If the temperature of the exhaust gas stream is low, more hydrocarbons are needed in order to maintain the temperature range. Increased emission control requirements have therefore often resulted in a loss of efficiency of the internal combustion engine. It is therefore important to produce methods which allow effective exhaust emission control without adversely affecting the efficiency of the engine.

Recirculation of exhaust gases, so-called EGR (Exhaust Gas Recirculation), is a known method in which a part of the total exhaust gas flow of the engine is recirculated and this subflow is fed to the inlet side of the engine, where it is mixed with incoming air for introduction into the cylinders of the engine. It thereby becomes possible to reduce the quantity of nitrogen oxide in the exhaust gases.

It is desirable to produce a method of using an internal combustion engine with an exhaust gas recirculation system, which method makes it possible to maintain a temperature range in the exhaust gas stream without unnecessary adverse effect upon the efficiency of the engine.

A method according to an aspect of the invention is characterized by the steps of detecting that neither the braking system nor the throttle control mechanism of the vehicle is activated and that the vehicle is being driven at a speed in excess of a predetermined value, and of regulating the gas flow through the EGR duct so that the gas flow to the exhaust aftertreatment system is reduced to a level which is less than about 50% of the gas flow to the exhaust aftertreatment system with shut-off EGR valve. By virtue of this method, heat losses in the exhaust gas stream to an exhaust aftertreatment system are prevented under certain driving conditions.

BRIEF DESCRIPTION OF THE FIGURES

The invention will now be described in greater detail below with reference to illustrative embodiments shown in the appended drawings, wherein.

DETAILED DESCRIPTION

Figure 1:
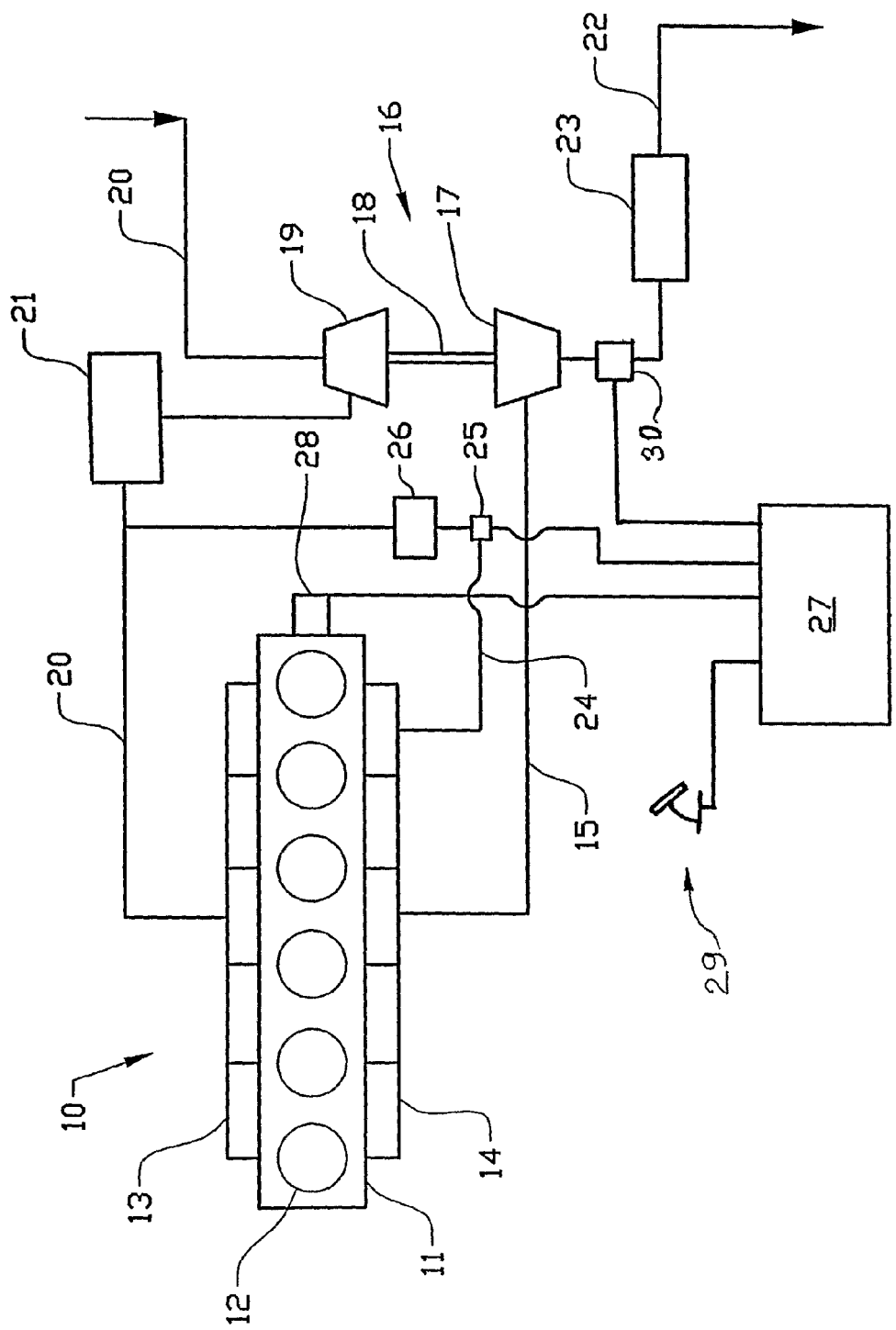
FIG. 1 shows in schematic representation an internal combustion engine in which the method according to the invention is applicable.

The internal combustion engine 10 shown in schematic representation in FIG. 1 is used in a vehicle, for example a truck or a bus, and comprises an engine block 11 comprising six piston cylinders 12, with an intake manifold 13 and an exhaust manifold 14. The exhaust gases are led via an exhaust pipe 15 to the turbine wheel 17 of a turbo unit 16. The turbine shaft 18 drives the compressor wheel 19 of the turbo unit, which, via an induction pipe 20, compresses incoming air and conveys it via a charge-air cooler 21 to the intake manifold 13.

Fuel is fed to the respective cylinder 12 via injection devices (not shown).

Exhaust gases which have passed through the turbocharger 16 are led onward to the atmosphere via the exhaust pipe 22, which leads the exhaust gases through an exhaust aftertreatment device, for example a particle trap or a catalyst 23. For example, regeneration of a particle trap can be achieved by the oxidation of unburnt fuel in a catalyst which is placed upstream of the particle trap. Fuel in the correct quantity is injected into the exhaust gas flow and the oxidation results in a temperature increase in the catalyst large enough to burn the soot in the particle trap.

Exhaust gases are led back to the induction side of the engine as so-called EGR gas, via a pipe 24, in order to reduce the engines emission of nitrogen oxide according to the prior art. This pipe comprises a valve 25, which serves both as a one-way valve and as a control valve for regulating the EGR flow. There is also a cooler 26 present for the cooling of EGR gases.

The valve 25 is connected to an engine control unit 27 containing control programs and control data for controlling the engine with regard to input data. The engine control unit 27 is connected, for example, to a sensor 28, which detects engine speed. The engine control unit 27 is further connected to a sensor 29, which registers whether either one of the braking system or the throttle control mechanism of the vehicle is actuated. An exhaust gas pressure regulator 30 can be mounted in the exhaust system between the exhaust turbine 17 and the aftertreatment unit 23 and is operated via the engine control unit 27, in order to create in the exhaust pipe a variable back pressure which can be used to increase the pressure in the exhaust manifold 14 and thereby increase the quantity of EGR which can be passed over to the intake manifold 13. Alternatively, the exhaust turbine 17 can be provided with variable geometry for regulation of the exhaust gas back pressure.

The method according to the invention is used as follows. The engine control unit 27 detects that the conditions for use are met, i.e. that neither one of the braking system or throttle control mechanism 29 of the vehicle is activated and the vehicle is being driven at a speed in excess of a predetermined value. The engine is therefore being driven without fuel supply by the kinetic energy of the vehicle. Now the gas flow through the EGR duct is regulated, via the valves 25 and 30, so that the gas flow to the exhaust aftertreatment system 23 is minimized. The result is that the mass flow from the engine falls drastically, whereupon the cooling-off of the aftertreatment system is severely reduced. The fact that the recirculated flow component can be controlled via the valves 25 and 30 allows the mass flow through the engine to be varied, which also makes it possible to control the drag torque, i.e. a certain braking power can be achieved with the above-described method.

Figure 2:
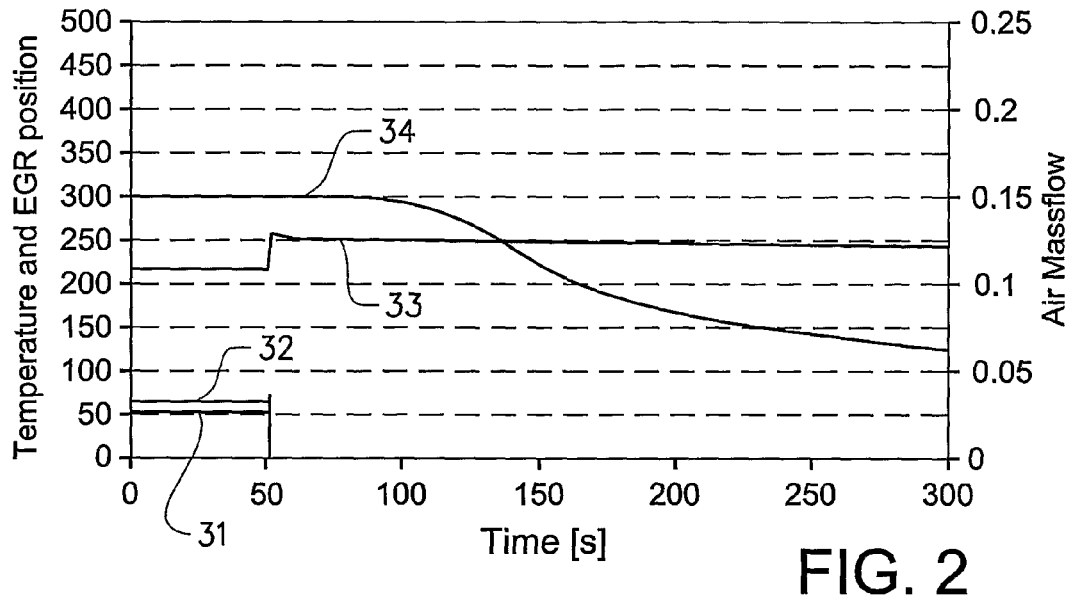
FIG. 2 is a graph which shows temperature, time and mass flow for an engine not using the method according to the invention.

FIG. 2 shows in the form of a graph the cooldown of a catalyst, which is mounted in an exhaust system to which an EGR circuit is connected, for a time interval of 300 seconds. At the 50 [s] point, the valve to the EGR circuit is shut off, as is illustrated by the curves 31 and 32, which indicate the control state of the EGR valve and the mass flow through the EGR circuit, respectively. When the mass flow through the EGR circuit ceases, a corresponding increase occurs in the mass flow to the catalyst, as can be seen from the curve 33. The temperature of the catalyst is represented by the curve 34, which shows that the catalyst maintains its temperature for a period of about 50 seconds after the EGR circuit is shut off. During the following subinterval of 50 seconds, the temperature in the catalyst falls from 300 degrees Celsius to about 225 degrees Celsius. After this, the rate of temperature loss starts to decrease, but the temperature continues to fall along the time axis of the graph, the temperature at the end of the measuring interval amounting to about 125 degrees Celsius.

Figure 3:
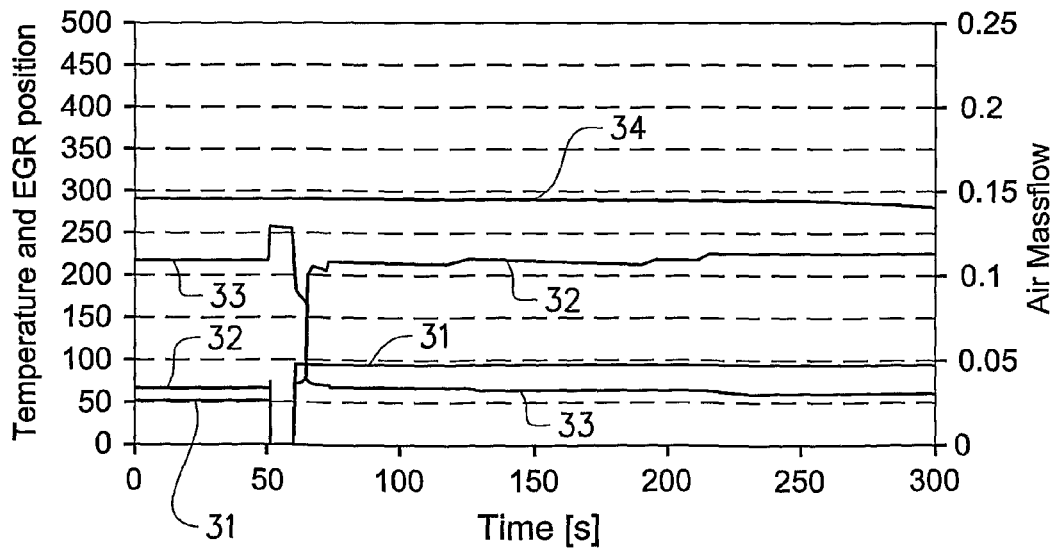
FIG. 3 is a corresponding graph which shows temperature, time and mass flow for an engine using the method according to the invention.

FIG. 3 shows correspondingly the cooldown of the catalyst when the method according to the invention is used. In the same way as in the preceding case, the valve to the EGR circuit is shut off at the 50 [s] point, as is illustrated by the curves 31 and 32. After a few seconds, the valve is opened to a maximum, so that the mass flow through the EGR circuit approximately corresponds to the earlier flow to the catalyst. In the example shown in FIG. 3, the residual flow to the catalyst accounts for about 30% of the gas flow with shut-off EGR valve. The fact that the residual flow to the catalyst is small means that the cooling power of the catalyst is small, as can be seen from the curve 34, which shows that the catalyst substantially maintains its original temperature throughout the measuring interval. The effect of the method according to the invention is also, of course, achieved in varying degree with other subflows than that which can be seen from FIG. 3. In order to obtain a significant effect, the gas flow to the exhaust aftertreatment system 23 should be reduced, however, to a level which is less than about 50% of the gas flow to the exhaust aftertreatment system with shut-off EGR valve.

The invention can advantageously be used on vehicles deployed with short repeated driving cycles, such as urban buses and garbage trucks.

The invention should not be regarded as limited to the above-described illustrative embodiments, but rather a host of further variants and modifications are conceivable within the scope of the following patent claims.

The invention claimed is:

1. A method for reducing heat loss in an exhaust aftertreatment system connected to the exhaust pipe of an internal combustion engine, which engine is used to propel a vehicle and is equipped with a valve-controlled EGR duct for adjustable recirculation of exhaust gases from the exhaust side of the engine to its induction side, comprising
 detecting that both a braking system and a throttle control mechanism of the vehicle are not activated and that the vehicle is being driven at a speed in excess of a predetermined value, and
 upon detecting that the braking system and the throttle control mechanism are not activated and that the vehicle is being driven at the speed in excess of the predetermined value, regulating gas flow through the EGR duct so that gas flow to an exhaust aftertreatment system is reduced to a level which is less than about 50% of the gas flow of the exhaust after-treatment system with a shut-off EGR valve.

2. The method as claimed in claim 1, comprising regulating the gas flow through the EGR duct so that the gas flow to the exhaust aftertreatment system is reduced to a level which is less than about 30% of the gas flow to the exhaust aftertreatment system with the shut-off EGR valve.

3. The method as claimed in claim 2, comprising regulating the gas flow through the EGR duct by the shutting-off a control throttle in an exhaust duct and opening of the EGR valve in the EGR duct.

4. The method as claimed in claim 3, wherein the control throttle in the exhaust duct comprises an exhaust gas pressure regulator.

5. The method as claimed in claim 3, wherein the control throttle in the exhaust duct comprises a turbo unit with variable geometry.

6. The method as claimed in claim 1, comprising regulating the gas flow through the EGR duct by the shutting-off a control throttle in an exhaust duct and opening of the EGR valve in the EGR duct.

7. The method as claimed in claim 6, wherein the control throttle in the exhaust duct comprises an exhaust gas pressure regulator.

8. The method as claimed in claim 6, wherein the control throttle in the exhaust duct comprises a turbo unit with variable geometry.

* * * * *